(12) United States Patent
Ueguri

(10) Patent No.: US 10,712,932 B2
(45) Date of Patent: Jul. 14, 2020

(54) ELECTRONIC DEVICE, METHOD FOR CONTROLLING ELECTRONIC DEVICE, AND NON-TRANSITORY COMPUTER READABLE MEDIUM

(71) Applicant: CANON KABUSHIKI KAISHA, Tokyo (JP)

(72) Inventor: Toshiaki Ueguri, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/218,632

(22) Filed: Dec. 13, 2018

(65) Prior Publication Data
US 2019/0187871 A1    Jun. 20, 2019

(30) Foreign Application Priority Data
Dec. 18, 2017 (JP) ................................ 2017-241943

(51) Int. Cl.
*G06F 3/0488* (2013.01)
*G06F 3/041* (2006.01)
(Continued)

(52) U.S. Cl.
CPC .......... *G06F 3/0488* (2013.01); *G06F 3/0412* (2013.01); *G06F 3/0416* (2013.01); *G06F 3/0485* (2013.01); *G06F 3/04845* (2013.01); *G06F 3/04883* (2013.01); *H04N 5/23245* (2013.01); *H04N 5/232933* (2018.08); *G06F 3/04847* (2013.01);
(Continued)

(58) Field of Classification Search
CPC ....... G06F 3/04886; G06F 2203/04806; G06F 2203/04104; G06F 2203/04808; G06F 3/041; G06F 3/044; G06F 3/0416; G06F 3/04883; G06F 3/04817; H04N 2201/0084; H04N 1/00453
See application file for complete search history.

(56) References Cited

U.S. PATENT DOCUMENTS

2007/0291303 A1* 12/2007 Tanaka ............... H04N 1/00204
358/1.15
2008/0309643 A1* 12/2008 Arimoto ............. G06F 3/04886
345/173
(Continued)

FOREIGN PATENT DOCUMENTS

JP    2014-229002 A    12/2014

*Primary Examiner* — Sanjiv D. Patel
(74) *Attorney, Agent, or Firm* — Cowan, Liebowitz & Latman, P.C.

(57) ABSTRACT

An electronic device includes: a control unit configured to control to regard, as a processing target, a display object at a position between touch positions of a first point and a second point and perform specific processing to the processing target according to a subsequent relative change between the touch positions when a multi-touch in which a time difference between starts of touching the first point and the second point is within a predetermined time is performed, and control to regard a display object at the touch position of the first point as a processing target and perform the specific processing to the processing target according to a subsequent relative change between the touch positions when a multi-touch in which a time difference between starts of touching the first point and the second point exceeds the predetermined time is performed.

20 Claims, 5 Drawing Sheets

(51) Int. Cl.
*H04N 5/232* (2006.01)
*G06F 3/0484* (2013.01)
*G06F 3/0485* (2013.01)

(52) U.S. Cl.
CPC .............. *G06F 2203/04104* (2013.01); *G06F 2203/04806* (2013.01); *G06F 2203/04808* (2013.01)

(56) References Cited

U.S. PATENT DOCUMENTS

| | | | |
|---|---|---|---|
| 2013/0234964 A1* | 9/2013 | Kim | G06F 3/0488 345/173 |
| 2014/0189605 A1* | 7/2014 | Helfman | G06F 3/017 715/863 |
| 2015/0169122 A1* | 6/2015 | Kulik | G06F 3/04883 345/173 |
| 2015/0365306 A1* | 12/2015 | Chaudhri | G06F 3/0416 715/736 |
| 2017/0308227 A1* | 10/2017 | Park | G06F 3/04883 |

* cited by examiner

ELECTRONIC DEVICE, METHOD FOR CONTROLLING ELECTRONIC DEVICE, AND NON-TRANSITORY COMPUTER READABLE MEDIUM

BACKGROUND OF THE INVENTION

Field of the Invention

The present invention relates to an electronic device in which a display object is allowed to be operated with a multi-touch operation, a method for controlling an electronic device, and a non-transitory computer readable medium.

Description of the Related Art

Some technologies detect touch operations at a plurality of places (hereinafter called multi-touches) with input devices such as touch panels and touch pads and allow complicated operations with the combination of the touch operations. For example, there has been known an electronic device in which an image displayed on a touch panel is allowed to be enlarged by pinch-out (the operation of enlarging the distance between two points touched by a multi-touch) and allowed to be reduced by pinch-in (the operation of reducing the distance between the two points touched by the multi-touch). In addition, there has been known an operation in which two points performed a multi-touch are twisted to rotate an image.

Japanese Patent Application Laid-open No. 2014-229002 proposes a technology in which when a multi-touch for performing pinch-in or pinch-out has been detected, a reference position for enlargement and reduction is changed according to the middle point between the touch position of a first point and the touch position of a second point in the multi-touch. More specifically, it is proposed that an image is enlarged based on the middle point when the middle point is inside an enlargement display area, and that the image is enlarged based on the central position of the enlargement display area when the middle point is outside the enlargement display area.

SUMMARY OF THE INVENTION

As represented by a multi-window system, there is a case that a plurality of display objects (images) is displayed on a display unit and then any of the display objects is selected and performed processing such as enlargement, reduction, and rotation. In this case, the operation of selecting a target to be processed each time results in an increase in the number of operation steps and thus is cumbersome. Even the technology of Japanese Patent Application Laid-open No. 2014-229002 does not solve a cumbersome problem in which the operation of selecting a display object to be processed from a plurality of display objects is separately required when one of the plurality of display objects is performed processing such as enlargement, reduction, and rotation.

In view of the above circumstances, the present invention provides an electronic device that makes it possible to operate a display object highly likely to be regarded as an operation target by a user among a plurality of display objects with good operability, a method for controlling an electronic device, a program, and a storage medium.

The present invention in its first aspect provides an electronic device comprising:

a touch detector configured to detect a touch operation on a display unit; and at least one processor or circuit to perform the operations of the following units:

a display control unit configured to control to display a plurality of display objects on the display unit; and a control unit configured to control to regard, as a processing target, a display object at a first position between a touch position of a first point and a touch position of a second point among the plurality of display objects and perform specific processing to the display object regarded as the processing target according to a subsequent relative change between the touch position of the first point and the touch position of the second point in a case where a multi-touch in which a time difference between a start of touching the first point and a start of touching the second point is within a predetermined time is performed, and control to regard a display object at the touch position of the first point as a processing target and perform the specific processing to the display object regarded as the processing target according to a subsequent relative change between the touch position of the first point and the touch position of the second point in a case where a multi-touch in which a time difference between the start of touching the first point and the start of touching the second point exceeds the predetermined time is performed.

According to the present invention, it is possible to operate a display object highly likely to be regarded as an operation target by a user among a plurality of display objects displayed on a display unit with good operability.

Further features of the present invention will become apparent from the following description of exemplary embodiments with reference to the attached drawings.

DESCRIPTION OF THE EMBODIMENTS

Figure 1A:
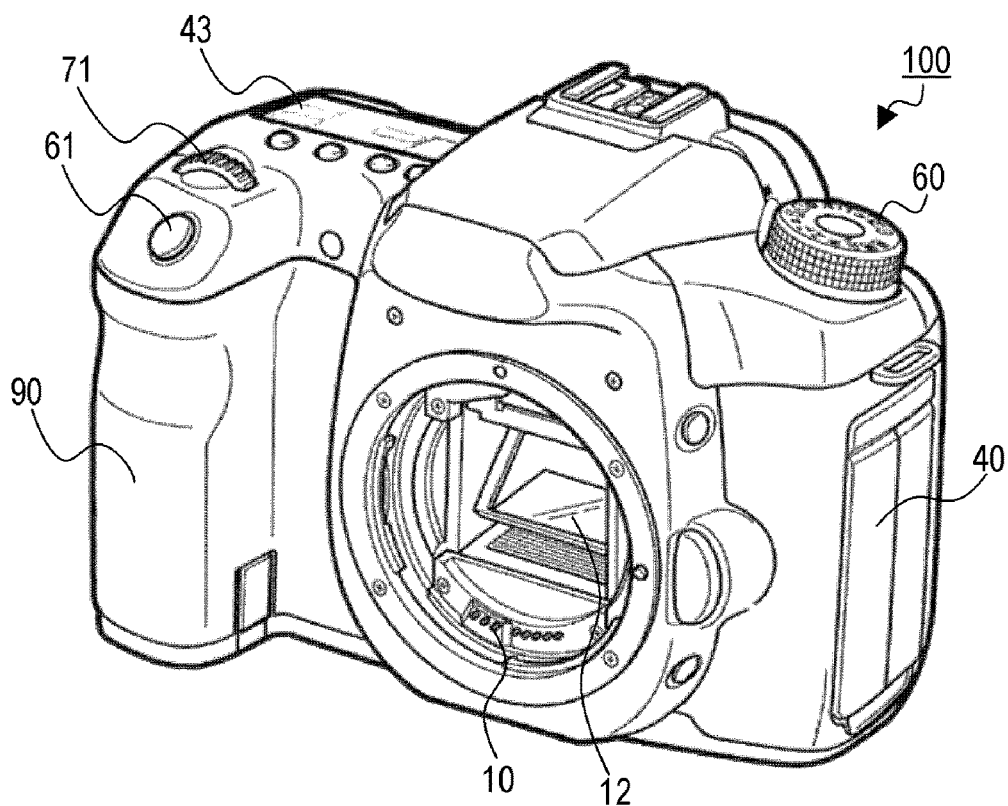
FIGS. 1A and 1B are views showing an example of the appearance of a digital camera.

Hereinafter, preferred embodiments of the present invention will be described in detail with reference to the drawings. In respective figures, the same configurations will be denoted by the same reference numerals as a rule, and their duplicated descriptions will be omitted. In addition, numerical values or the like illustrated for embodying descriptions are not limited unless otherwise particularly mentioned.

Moreover, the present invention is not limited to the following embodiments but is appropriately changeable without departing from its scope. For example, the respective configurations of the following embodiments may be appropriately corrected or changed depending on the configurations or various conditions of apparatuses to which the present invention is applied.

First Embodiment

External and Internal Configurations of Display Apparatus

Hereinafter, the preferred embodiments of the present invention will be described with reference to the drawings.

Figure 1B:
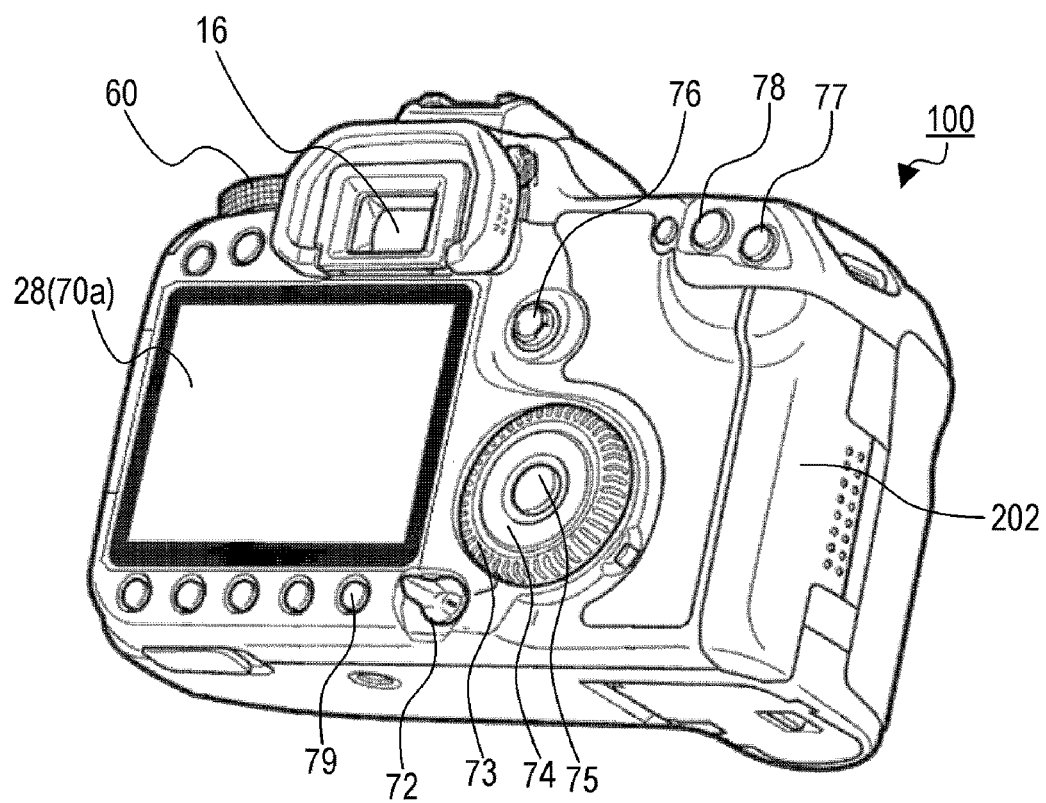

FIGS. 1A and 1B are views showing an example of the appearance of a digital camera 100 of the present embodiment. FIG. 1A is a front perspective view of the digital camera 100, and FIG. 1B a back perspective view of the digital camera 100. A display unit 28 is a display unit provided on the back surface of the camera, and displays an image (display object) or various information. A finder outer display unit 43 is a display unit provided on the upper surface of the digital camera 100 to display the various setting values of the camera such as a shutter speed and an aperture. A shutter button 61 is an operation unit for issuing a shooting instruction. A mode selection switch 60 is an operation unit for switching between various modes. A terminal cover 40 is a cover for protecting a connector (not shown) such as a connection cable for connecting a connection cable for external device and the digital camera 100 to each other. A main electronic dial 71 is a rotation operation member included in an operation unit 70. The rotation of the main electronic dial 71 allows a change or the like in setting values such as a shutter speed and an aperture.

The operation unit 70 (FIG. 2) is the generic name of members such as a button and a dial for receiving physical operations by a user. A power switch 72 is an operation member for switching between the ON and OFF states of the power of the digital camera 100. A sub-electronic dial 73 is a rotation operation member included in the operation unit 70 and used to perform the movement of a selected frame, image feeding, or the like. An arrow key 74 is included in the operation unit 70 and is an arrow key (four-way key) of which the upper, lower, left, and right portions are each capable of being pressed. It is possible to perform an operation according to a pressed portion of the arrow key 74. A SET button 75 is included in the operation unit 70, is a press button, and is used to determine a selected item, or the like. A LV button 76 is included in the operation unit 70 and is a button for switching between the ON and OFF states of a live view (hereinafter abbreviated as LV) in a menu button. In a moving-picture shooting mode, the LV button 76 is used to instruct the start and stop of shooting (recording) a moving image. An enlargement button 77 is included in the operation unit 70 and is an operation button for turning ON and OFF an enlargement mode in the LV display of a shooting mode and changing an enlargement ratio in the enlargement mode. In a reproduction mode, the enlargement button 77 functions as an enlargement button for enlarging a reproduction image and increasing an enlargement ratio. A reduction button 78 is included in the operation unit 70 and is a button for reducing the enlargement ratio of an enlarged reproduction image and reducing a displayed image. A reproduction button 79 is included in the operation unit 70 and is an operation button for switching between the shooting mode and the reproduction mode. The pressing of the reproduction button 79 in the shooting mode starts the reproduction mode to allow the latest image among images recorded in a storage medium 200 to be displayed on the display unit 28.

In addition, a touch panel 70a for detecting a touch operation on the display unit 28 is also included in the operation unit 70. The touch panel 70a is a transparent plate-shaped member having transparency to such an extent that the display of the display unit 28 is not disturbed, and is provided on the upper layer of the display surface of the display unit 28. The touch panel 70a (touch detector) detects a touch operation on the display unit 28.

A quick return mirror 12 is lifted up and down by an actuator (not shown) according to an instruction from a system control unit 50. A communication terminal 10 is a communication terminal used when the digital camera 100 performs communication with a lens unit. A finder 16 is a looking-into type finder for confirming the focus or the structural outline of the optical image of an object obtained via a lens unit 150 by the observation of a focusing screen 13. A lid 202 is a lid for a slot for storing the storage medium 200. A grip portion 90 is a holding unit having a shape allowing a user to easily grip the digital camera 100 with a right hand when holding the digital camera 100 up.

Figure 2:
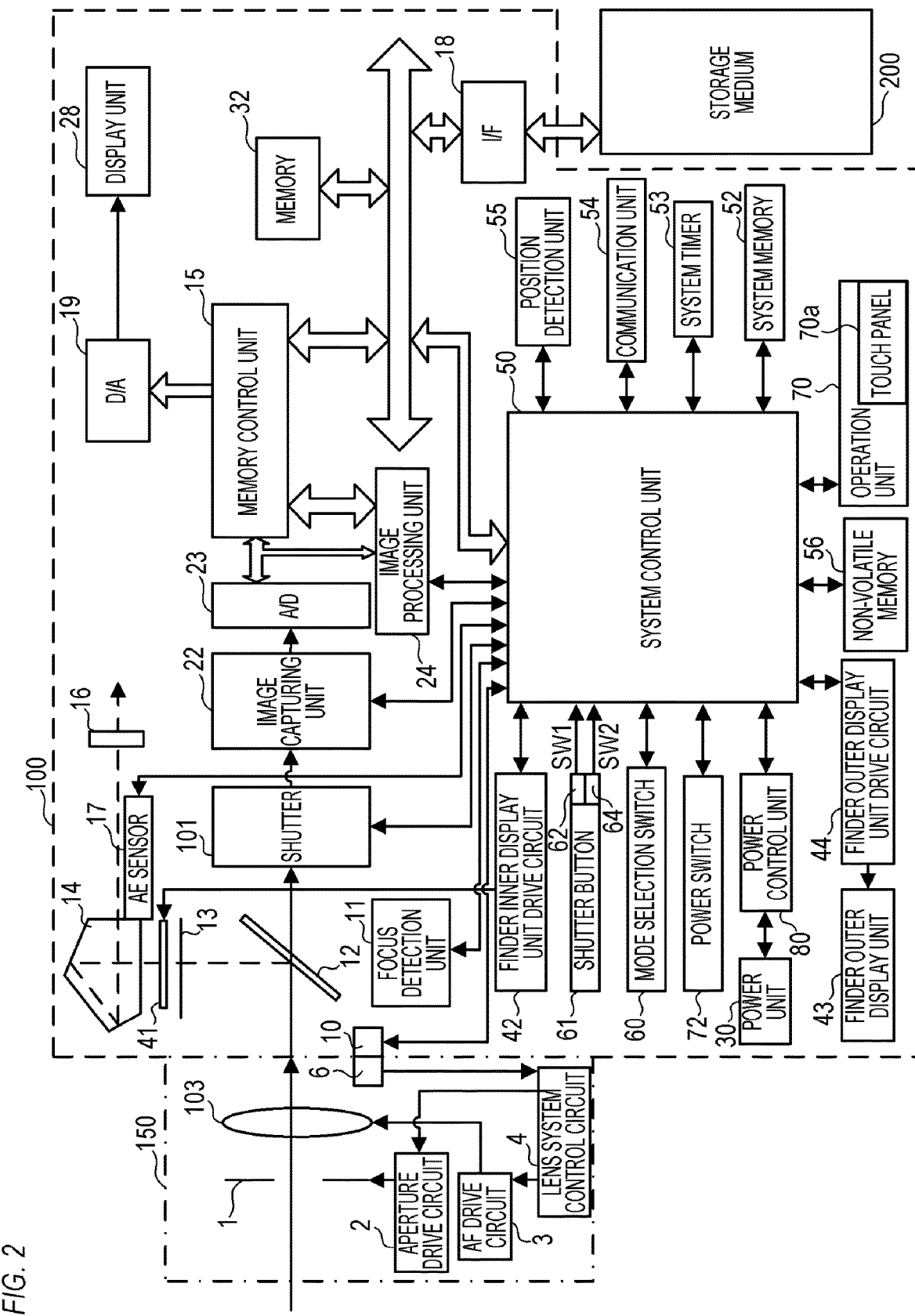
FIG. 2 is a block diagram showing an internal configuration example of the digital camera.

FIG. 2 is a block diagram showing an internal configuration example of the digital camera 100 of the present embodiment.

First, the configuration of the lens unit 150 will be described. The lens unit 150 is a lens unit on which a replaceable shooting lens is mounted. A lens 103 is generally constituted by a plurality of lenses, but only a single lens is shown here for simplification. The communication terminal 6 is a communication terminal used when the lens unit 150 performs communication with the digital camera 100. In addition, the digital camera 100 includes the communication terminal 10. The lens unit 150 communicates with the system control unit 50 via the communication terminals 6 and 10, controls an aperture 1 via an aperture drive circuit 2 with an internal lens system control circuit 4, and displaces the position of the lens 103 via an AF drive circuit 3 to adjust a focus.

Next, the body part of the digital camera 100 will be described. An AE sensor 17 performs the photometry of the brightness of an object via the lens unit 150. A focus detection unit 11 outputs defocus amount information to the system control unit 50. The system control unit 50 controls the lens unit 150 based on the defocus amount information and performs a phase detection AF. The quick return mirror 12 (hereinafter abbreviated as the mirror 12) is lifted up and down by the actuator (not shown) according to an instruction from the system control unit 50 at the time of making an exposure, shooting a live view, and shooting a moving image. The mirror 12 is a switching mirror for selecting whether the light path of incident light from the lens 103 is guided to the side of the finder 16 or the side of an image capturing unit 22. At a normal time, the mirror 12 is arranged on the light path of the incident light (mirror down) to reflect the incident light and guide the same to the finder 16. On the other hand, at the time of performing shooting or a live view display, the mirror 12 is thrown up and evacuated from the light path of the incident light to guide the incident light to the image capturing unit 22 (mirror up). In addition, the mirror 12 has a half mirror at its central part to allow some of light to pass therethrough, and causes some of a light flux to pass therethrough so as to be incident on the focus detection unit 11 for performing focus detection.

A shooting person is allowed to confirm the focus or the structural outline of the optical image of an object obtained via the lens unit 150 by observing the focusing screen 13 via a pentaprism 14 and the finder 16.

A shooting person is allowed to confirm the focus or the structural outline of the optical image of an object obtained via the lens unit 150 by observing the focusing screen 13 via a pentaprism 14 and the finder 16. A shutter 101 is a focal plane shutter capable of freely controlling the exposure time of the image capturing unit 22 with the control of the system control unit 50.

The image capturing unit 22 is an image capturing element (image sensor) constituted by CCD elements, CMOS elements, or the like that convert an optical image into an electric signal. An A/D convertor 23 has the function of converting an analog signal into a digital signal and is used to convert an analog signal output from the image capturing unit 22 into a digital signal.

An image processing unit 24 performs resize processing such as predetermined pixel interpolation and reduction or color conversion processing on data from the A/D convertor 23 or data from a memory control unit 15. In addition, the image processing unit 24 performs predetermined calculation processing using captured image data and outputs an obtained calculation result to the system control unit 50. The system control unit 50 performs exposure control, distance measurement control, or the like based on an output calculation result. Thus, the system control unit 50 performs automatic focus (AF) processing in a through the lens (TTL) system, automatic exposure (AE) processing, pre-flash emission (EF) processing. In addition, the system control unit 50 performs all white balance (AWB) processing in a TTL system based on an output calculation result.

Output data from the A/D convertor 23 is directly written into a memory 32 via the image processing unit 24 and the memory control unit 15 or via the memory control unit 15. The memory 32 stores image data converted into digital data by the A/D convertor 23 after being acquired by the image capturing unit 22 or image data such as an icon to be displayed on the display unit 28. In addition, the memory 32 has sufficient storage capacity to store a predetermined number of still images or moving images and sounds in a predetermined time.

Moreover, the memory 32 serves also as a memory (video memory) for displaying an image. A D/A convertor 19 converts data for displaying an image stored in the memory 32 into an analog signal and supplies the converted analog signal to the display unit 28. Thus, image data for a display written into the memory 32 is displayed on the display unit 28 via the D/A convertor 19. The display unit 28 performs a display on a display device such as a LCD according to an analog signal from the D/A convertor 19. Image data captured by the image capturing unit 22 and temporarily accumulated in the memory 32 is analog-converted by the D/A convertor 19 and sequentially transferred to the display unit 28 to be displayed, whereby a through-image display (live-view display) may be performed. That is, the display unit 28 may be caused to function as an electronic view finder.

On a liquid-crystal display unit 41 inside the finder, a frame (AF frame) showing a distance measurement point at which an automatic focus is currently performed, an icon showing the setting state of the camera, or the like is displayed via a finder inner display unit drive circuit 42. In addition, on a finder outer display unit 43, the various setting values of the camera such as a shutter speed and an aperture are displayed via a finder outer display unit drive circuit 44.

A non-volatile memory 56 is an electrically deletable and recordable memory, and an EEPROM or the like is, for example, used as such. In the non-volatile memory 56, a constant for operating the system control unit 50, a program, or the like is stored. Here, the program represents a program for performing various flowcharts that will be described later in the present embodiment.

The system control unit 50 is a control unit constituted by at least one processor or circuit and controls the whole digital camera 100. By performing a program recorded in the non-volatile memory 56 described above, the system control unit 50 realizes the respective processing of the present embodiment that will be described later. A RAM is used as a system memory 52. In the system memory 52, a constant for operating the system control unit 50, a variable, a program read from the non-volatile memory 56, or the like is developed. In addition, the system control unit 50 has a function as display control unit for performing control to display one or a plurality of display objects with respect to the memory 32, the D/A convertor 19, the display unit 28, or the like. A system timer 53 is a timer unit that measures a time used for performing various control and a time of an internal clock.

A mode selection switch 60, a first-shutter switch 62, a second-shutter switch 64, and the operation unit 70 are operation unit with which a user inputs various operation instructions to the system control unit 50. The mode selection switch 60 is used to switch the operation mode to any of the system control unit 50 to any of still-image recording mode, a moving-image shooting mode, a reproduction mode, or the like. The still-image recording mode includes an automatic shooting mode, an automatic scene determination mode, a manual mode, an aperture priority mode (Av mode), a shutter speed priority mode (Tv mode), and a program AE mode. In addition, the still-image recording mode includes a various-scene mode for performing shooting settings for each shooting scene, a custom mode, or the like. With the mode selection switch 60, the user is allowed to directly switch the operation mode to any of these modes. Alternatively, after temporarily switching to the list screen of the shooting modes with the mode selection switch 60, the user may select any of the plurality of the displayed modes and switch the operation mode to the selected mode using other operation members. Similarly, the moving-image shooting mode may include a plurality of modes.

The first-shutter switch 62 is turned on halfway through the operation of the shutter button 61 provided in the digital camera 100, i.e., when the user performs so-called the half pressure of the shutter button 61 (the user issues a shooting preparation instruction), and outputs a first-shutter switch signal SW1 to the system control unit 50. With the output of the first-shutter switch signal SW1, the operation of automatic focusing (AF) processing, automatic exposure (AE) processing, automatic white balance (AWB) processing, pre-flash emission (EF) processing, or the like is started.

The second-shutter switch 64 is turned on when the operation of the shutter button 61 is completed, i.e., when the user fully presses the shutter button 61 (the user issues a shooting instruction), and outputs a second-shutter switch signal SW2 to the system control unit 50. With the reception of the second-shutter switch signal SW2, the system control unit 50 starts the operation of a series of shooting processing from reading a signal from the image capturing unit 22 to writing image data in the storage medium 200.

The respective operation members of the operation unit 70 are appropriately assigned functions according to situations with the selective operation or the like of various function icons displayed on the display unit 28, and act as various function buttons. The function buttons include, for example, a complete button, a back button, an image feeding button, a jump button, a narrowing button, an attribute change button, or the like. For example, when a menu button is pressed, a menu screen allowing various settings is displayed on the display unit 28. Using the menu screen displayed on the display unit 28, a four-way button in vertical and horizontal directions, and a SET button, the user is allowed to intuitively perform the various settings.

The operation unit 70 is the generic name of operation members such as a press button, a rotation dial, and a touch sensor for receiving operations from the user. The operation unit 70 includes, for example, the main electronic dial 71, the sub-electronic dial 73, the arrow key 74, the SET button 75, the LV button 76, the enlargement button 77, the reduction button 78, and the reproduction button 79.

A power control unit 80 is constituted by a battery detection circuit, a DC-DC convertor, a switch circuit for switching a block to be energized, or the like, and detects the loading of a battery, the type of the battery, and the remaining amount of the battery. In addition, the power control unit 80 controls the DC-DC convertor based on its detection result and an instruction from the system control unit 50, and supplies a required voltage to respective units including the storage medium 200 over a required period. The power unit 30 is constituted by a primary battery such as an alkali battery and a lithium battery, a secondary battery such as a NiCd battery, a NiMH battery, and a Li battery, an AC adapter, or the like.

A storage medium I/F 18 is an interface with the storage medium 200 such as a memory card and a hard disk. The storage medium 200 is a storage medium such as a memory card for recording a captured image, and includes a semiconductor memory, a magnetic disk, or the like.

A communication unit 54 sends and receives a video signal or a sound signal to and from external device connected thereto via a wireless or wired cable. In addition, the communication unit 54 may send and receive a signal to and from external device via a wireless local area network (LAN) or the Internet. The communication unit 54 may also send an image (including a LV image) captured by the image capturing unit 22 or an image recorded in the storage medium 200 to external device, and may receive an image and various other information from the external device.

A position detection unit 55 detects the position of the digital camera 100 relative to a gravity direction. Based on a position detected by the position detection unit 55, the system control unit 50 determines whether an image captured by the image capturing unit 22 is an image captured when the user horizontally holds the digital camera 100 or an image captured when the user vertically holds the digital camera 100. The system control unit 50 may add direction information corresponding to a position detected by the position detection unit 55 to the image file of an image captured by the image capturing unit 22, or may rotate and record the image according to the position. As the position detection unit 55, an acceleration sensor, a gyro sensor, or the like may be used. Note that the use of the acceleration sensor or the gyro sensor as the position detection unit 55 makes it possible to detect the movement of the digital camera 100 (the panned state, the tilted state, the lifted state, the static state, or the like).

The operation unit 70 includes the touch panel 70a capable of detecting a touch operation on the display unit 28. The touch panel 70a is made of a transparent material having transparency to such an extent that the display of the display unit 28 is not disturbed, and is provided on the upper layer of the display unit 28. Further, input coordinates in the touch panel 70a and display coordinates on the display unit 28 are associated with each other. Thus, a GUI (graphical user interface) making the user feel as if he/she were capable of directly operating a screen displayed on the display unit 28 may be configured.

The touch panel 70a may be any of various types of touch panels such as a resistance film type, a capacitance type, a surface acoustic type, an infrared type, an electromagnetic induction type, an image recognition type, and an optical sensor type. Some types include a type that detects a touch operation when a touch panel is touched and a type that detects a touch operation when a finger or a pen approaches a touch panel, but any of the types may be used.

The system control unit 50 is capable of detecting the following operations or states with respect to the touch panel 70a.

First, the system control unit 50 detects a state in which a finger or a pen that has not touched the touch panel 70a newly touches the touch panel 70a (hereinafter referred to as touch-down) and acquires the coordinates of a touch position. In addition, when the touch panel 70a is touched by a plurality of fingers at its plurality of places, the system control unit 50 acquires the coordinates of each of touch positions. That is, the system control unit 50 receives touch operations (multi-touch) at its plurality of places on the touch panel 70a.

Second, the system control unit 50 detects a state in which the touch panel 70a is moved while being touched by a finger or a pen (hereinafter referred to as touch-move).

Third, the system control unit 50 detects a state in which a finger or a pen that has touched the touch panel 70a is released (hereinafter referred to as touch-up).

Fourth, the system control unit 50 detects a state in which the touch panel 70a is touched by a finger or a pen (hereinafter referred to as touch-on). The system control unit 50 detects the touch-on simultaneously with the detection of the touch-down. Accordingly, the system control unit 50 continues to detect the touch-on unless the touch-up is detected after the touch-down. In addition, the system control unit 50 also continues to detect the touch-on when detecting the touch move. However, even if the touch-on has been detected, the system control unit 50 does not detect the touch-move unless a touch position has been moved.

Fifth, the system control unit 50 detects a state in which nothing has touched the touch panel 70a (hereinafter referred to as touch-off). Accordingly, when a touch operation has not been performed on the touch panel 70a, the system control unit 50 continues to detect the touch-off. In addition, the system control unit 50 detects a state in which the multi-touch has been performed on the touch panel 70a and all fingers or pens that have touched the touch panel 70a are released (the touch-up), and also detects the touch off.

The touch panel 70a outputs these operations and states or the coordinates of a touch position of a finger or a pen to the system control unit 50 via an internal bus. In addition, when the coordinates of a touch position have been changed, the system control unit 50 may also acquire the movement direction and the movement amount of a touched finger or a pen for each vertical component and each horizontal component.

Based on information output from the touch panel 70a, the system control unit 50 determines what an operation (touch operation) has been performed on the touch panel 70a. For example, the system control unit 50 detects the touch move when the coordinates of a touch position have been changed. In addition, the system control unit 50 determines that a slide operation has been performed when detecting the touch move by at least a predetermined distance. Moreover, the system control unit 50 determines that a flick has been performed when a touch position has been moved at at least a predetermined speed and by at least a predetermined distance and then a touch has been released in succession to the movement. The flick represents the operation of quickly tracing the touch panel 70a so as to be flipped with a finger.

Further, the system control unit 50 determines pinch-in and pinch-out by detecting a touch operation with two fingers on the touch panel 70a. Specifically, the system control unit 50 determines the pinch-out when the distance between two touch positions has been relatively increased, and determines the pinch-in when the distance between two touch positions has been relatively decreased. The pinch-out is used to enlarge an image, while the pinch-in is used to reduce the image. Note that the pinch-out and the pinch-in will be generically called a pinch operation (or simply a pinch) below.

Hereinafter, a touch operation in a dual-screen display mode that causes two images to be displayed on the display unit 28 will be described using a specific example. Note that an example in which two images are displayed on the display unit 28 will be described in the following example, but at least three images may be displayed.

FIGS. 3A to 3D are views showing a display example of a dual-screen display mode as one of display modes in the reproduction mode of the digital camera 100.

Figure 3A:
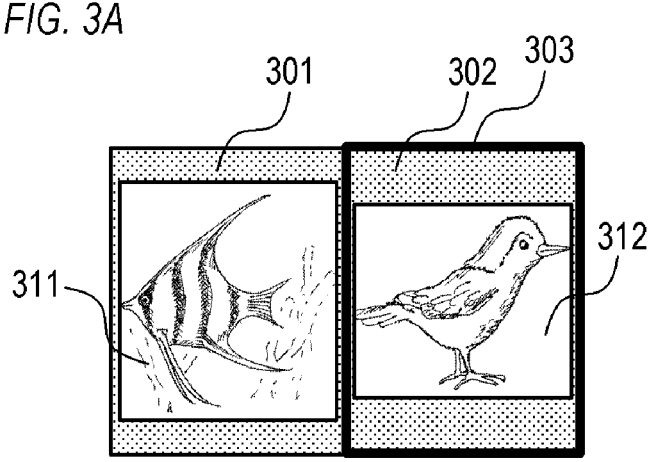
FIGS. 3A to 3D are views showing a display example of a dual-screen display mode.

When the digital camera 100 is put in the reproduction mode and then put in the dual-screen display mode, a display in the dual-screen display mode as shown in the example of FIG. 3A is performed in the display unit 28. In the dual-screen display mode, the display unit 28 is evenly divided into a left-side region 301 and a right-side region 302, and an image captured by the image capturing unit 22 and recorded in the storage medium 200 is separately reproduced and displayed in each of the left-side region 301 and the right-side region 302. Since the dual-screen display mode allows two images to be simultaneously displayed on one screen, the operation of switching between the images is eliminated, whereby image confirmation and editing works may be more efficiently performed.

Operation Example of Multi-Touch

Hereinafter, an operation example of a multi-touch in a case in which the dual-screen display mode is set will be described. In the example of FIG. 3A, an image 311 and an image 312 are displayed in the left-side region 301 and the right-side region 302, respectively, so as to be fitted therein as a whole without being enlarged and displayed. The user is allowed to specify any one of the left-side region 301 and the right-side region 302 as an active region. The active region represents a region specified by the user as a target to be operated when a screen is displayed in each of a plurality of regions on the display unit 28. In a region specified as the active region, an active frame 303 (identification display) is displayed. In the example of FIG. 3A, the active frame 303 is displayed in the right-side region 302.

An image in an active region may be performed various processing such as image switching (image feeding) for switching a display image to another image, deleting, protecting, assigning an attribute such as a favorite, rotating an image, and resizing. Hereinafter, an image to be processed will be called a target image.

The specification of an active region prevents the occurrence of a false operation such as deleting an image in a region other than the active region when an operation accompanying a change in the content of the image is performed. Note that the active region is switchable according to a user operation.

On the other hand, even an image in a region other than an active region may also regarded as a target image when an operation not accompanying a change in the content of the image such as moving, enlargement, or reducing the image is performed.

For example, in the present embodiment, it is possible to enlarge and reduce an image by the pinch-in and the pinch-out regardless of an active region. Thus, since the switching of the active region is not required to enlarge and reduce an image, an operation may be more quickly performed. Accordingly, it is also possible to enlarge and reduce an image in a region other than the active region by the pinch-out and the pinch-in. The pinch-out represents a touch operation in which two fingers are pressed and spread while being touched on a screen to increase the interval between the fingers. An image is enlarged by the pinch-out. Further, the pinch-in represents a touch operation in which two fingers are pinched while being touched on the screen to decrease the interval between the fingers. An image is reduced by the pinch-in.

In the present embodiment, a target image to be performed enlargement and reduction is selected by a multi-touch operation regardless of an active region. A method for selecting a target image to be performed enlargement and reduction processing is changed depending on whether a time difference between two fingers that have performed the touch-down is not more than a predetermined time. Hereinafter, a case in which a time difference between two fingers that have performed the touch-down is not more than a predetermined time will be described with reference to FIG. 3B, while a case in which a time difference between the two fingers that have performed the touch-down is the predetermined time or more will be described with reference to FIGS. 3C and 3D.

Figure 3B:
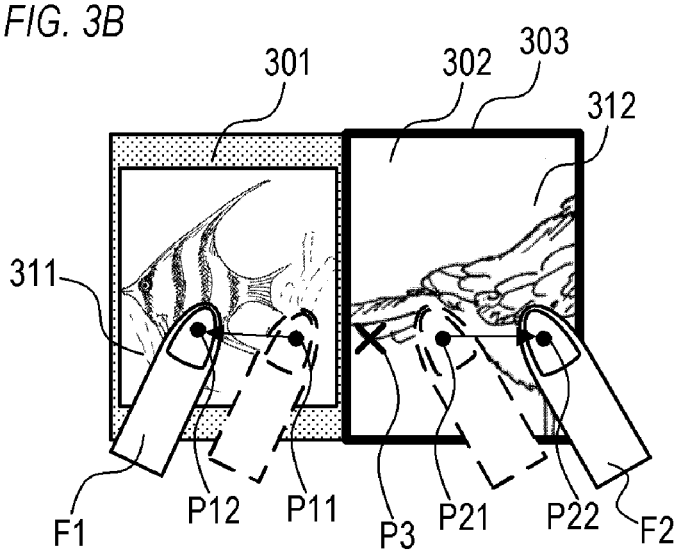

FIG. 3B is a view showing a first example of the pinch-out. In the example of FIG. 3B, it is assumed that a finger F1 has performed the touch-down at a position P11 inside the left-side region 301 and then a finger F2 has performed the touch-down at a position P21 inside the right-side region 302 within a threshold T1 representing a predetermined time (for example, 0.3 seconds). That is, the finger F1 and the finger F2 have performed the touch-down almost simultaneously. After that, it is assumed that the finger F1 has performed the touch-move from the position P11 to a position P12 and that the finger F2 has performed the touch-move from the position P21 to a position P22 in a state of holding their touched states. Thus, the finger F1 and the finger F2 have performed the pinch-out. In addition, it is assumed that the middle point between the position P11 and the position P21 (the point at the position even from the respective touch positions) is a position P3.

In this case, with the position P3 as a reference position, the system control unit 50 enlarges an image 312 at a position corresponding to the position P3 of the middle point about the position P3. The reference position for enlargement and reduction represents a position about which the enlargement and the reduction are to be performed, and the coordinates of the reference position before the processing of the enlargement or the reduction and the coordinates of the reference position after the processing are the same. That is, the enlargement is performed in such a manner that an image is radially expanded about the reference position, while the reduction is performed in such a manner that the image is radially reduced about the reference position.

As described above, when a multi-touch in which a time difference between the start of touching a first point and the start of touching a second point is within a predetermined time is performed, the system control unit 50 (control unit) regards an image at the middle point between the touch position of the first point and the touch position of the second point as a target image. Then, the system control unit 50 enlarges or reduces the target image according to a change (relative change) in the distance between the touch position of the first point and the touch position of the second point.

When the image 311 is displayed at the position P12 at which the touch of the first point is started and the image 312 is displayed at the middle point between the touch positions of the first point and the second point, the system control unit 50 enlarges and reduces the image 312 without processing the image 311.

This is because it is assumed that the user has originally started a pinch operation with attention paid to the middle point between the two points. Alternatively, this is because it is assumed that the user has intended to touch points to be enlarged or reduced with two fingers and enlarge or reduce an image by the pinch operation without being particularly conscious of two images.

Figure 3C:
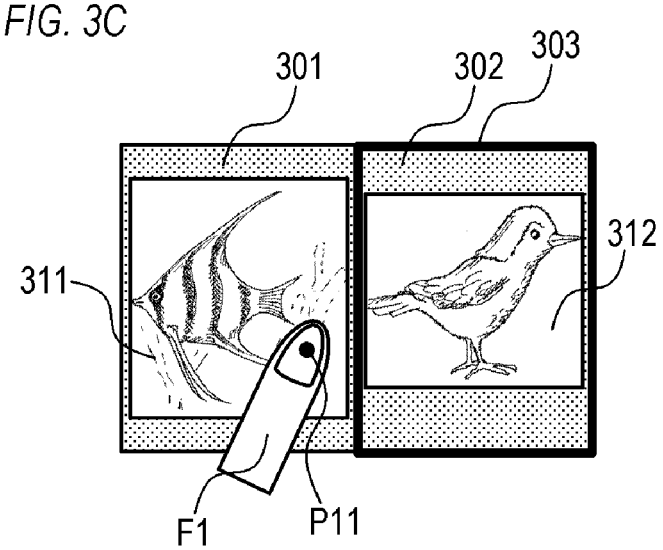
Figure 3D:
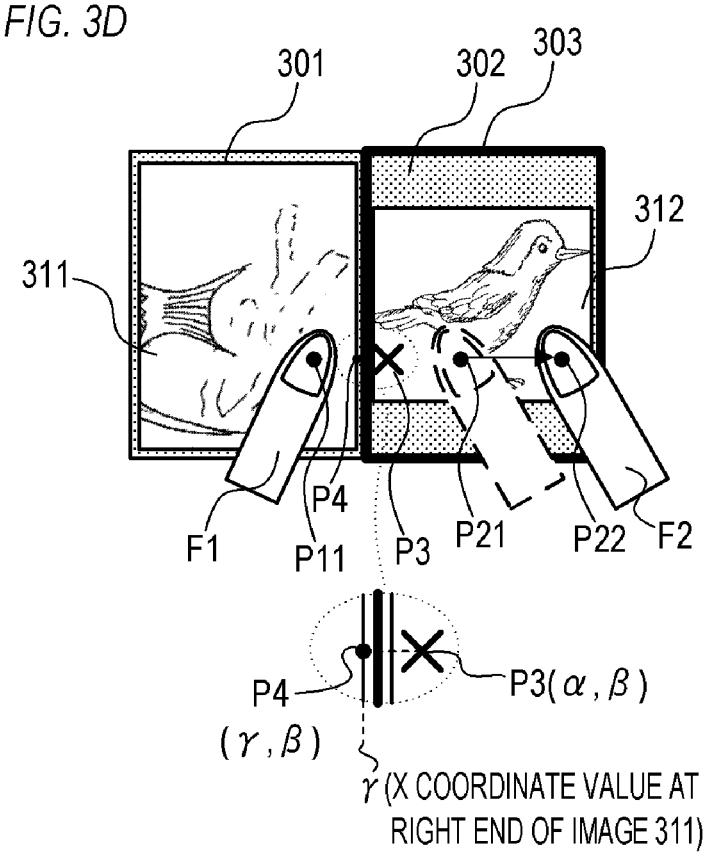

Note that in the example of FIGS. 3C and 3D as well, a target image is enlarged or reduced according to a change in the distance between the touch position of a first point and the touch position of a second point like the example of FIG. 3B.

Further, even when the position of a middle point deviates from an initial position as in a case in which the movement amount of the finger F2 is greater than that of the finger F1, the position P3 of the middle point between touch positions at which the finger F1 and the finger F2 have first performed the touch-down becomes a reference position and the reference position does not move. Thus, when the user performs the pinch-out and the pinch-in, the deviation of a reference position due to user's habit such as moving one touched finger faster than the other touched finger may be prevented.

FIGS. 3C and 3D are views showing a second example of the pinch-out. In the example of FIGS. 3C and 3D, it is assumed that a time difference between the two fingers that have performed the touch-down is greater than the predetermined time. First, as shown in FIG. 3C, it is assumed that the finger F1 has performed the touch-down at the position P11 inside the left-side region 301.

At this time, when the finger F1 has performed the touch-move, the system control unit 50 moves the position of the image 311 according to the position of the finger F1.

It is assumed that in succession to the touch-down of the finger F1, the finger F2 has performed the touch-down at the position P21 inside the right-side region 302 after the elapse of the threshold T1 representing the predetermined time (for example, 0.3 seconds) with the finger F1 holding its touched state as shown in FIG. 3D. Note that the middle point between the position P11 and the position P21 is the position P3, and that the position P3 is inside the right-side region 302. After that, it is assumed that the finger F2 has performed the touch-move from the position P21 to the position P22 with the fingers F1 and F2 holding their touched states to perform the pinch-out.

In this case, instead of the image 312 at the position P3 of the middle point, the system control unit 50 regards the image 311 displayed in the left-side region 301 in which the position P11 representing the touch position of the first point is present as a target image to be enlarged.

As described above, the middle point between the touch positions of the two points at which the pinch operation is to be performed becomes the reference position in the example of FIG. 3B. On the other hand, in the example of FIGS. 3C and 3D, when the middle point between the touch positions of the two points at which the pinch operation is to be performed is outside a region in which a target image to be enlarged or reduced is displayed, the system control unit 50 regards the end of a target image on a side closer to the middle point between the touch positions of the two points as the reference position.

In the example of FIG. 3D, it is assumed that a horizontal axis is an X-axis, a vertical axis is a Y-axis, the coordinates P3 of the middle point between the touch positions of the two points at which the pinch operation is to be performed are coordinates ($\alpha$, $\beta$), and the X-coordinate of the right end in the region in which the image 311 as a target image is displayed is $\gamma$. Note that an enlarged view of a portion around the middle point is shown in FIG. 3D. When the middle point P3 of the touch positions of the two points is outside the display region of the image 311, the system control unit 50 makes the Y-coordinate of the reference position P4 coincide with $\beta$ that is the same as the Y-coordinate of the middle point P3. In addition, the system control unit 50 makes the X-coordinate of the reference position P4 coincide with the coordinate $\gamma$ of the right end of the image 311 and makes the Y-coordinate of the reference position P4 coincide with $\beta$ that is the same as the Y-coordinate of the middle point P3 between the touch positions of the two points, and sets the coordinates of the reference position P4 at ($\gamma$, $\beta$). That is, when the middle point P3 between the touch position P11 of the first point and the touch position P21 of the second point is outside the image 311 as a target image, the system control unit 50 enlarges or reduces the target image 311 about the point P4 inside the image 311 closest to the middle point P3.

As described above, when a multi-touch in which a time difference between the start of touching a first point and the start of touching a second point is a predetermined time or more is performed, the system control unit 50 (control unit) regards an image at the touch position of the first point as a target image. Then, the system control unit 50 enlarges or reduces the target image according to a change in the distance between the touch position of the first point and the touch position of the second point.

Accordingly, when the image 311 is displayed at the position P11 at which the touch of the first point is started and the image 312 is displayed at the middle point between the touch position of the first point and the touch position of the second point, the system control unit 50 regards the image 311 as a target image instead of the image 312.

This is because it is assumed that the user has started the pinch operation with attention paid to the touch position of the first point (the user has started the pinch operation after specifying a target to be enlarged and reduced). Alternatively, this is because there could be a case in which the user adjusts a display range in which an image touched at the first point is enlarged and displayed to a desired view range by the touch-move of the first point and then enlarges the desired view range by the pinch operation of a multi-touch to which the second point is added.

Further, when the middle point between the touch positions of two points is present inside the display region of a target image, the coordinates of the middle point become a reference position for enlargement and reduction. On the other hand, when the middle point is present outside the display region of the target image, a point inside a target image closest to the middle point becomes the reference position. Thus, even if the middle point is present outside a target image when the user performs the pinch-out or the pinch-in to enlarge or reduce the vicinity of the end of the target image, the user is not required to perform an operation again, which produces the effect of improving convenience.

In addition, the present embodiment describes an example in which when the finger F1 has performed the touch-move before a multi-touch (the touch-down of the finger F2) after performing the touch-down on the image 311, the position of the image 311 is moved according to the position of the finger F1. As described above, the movability of the image 311 before the pinch operation allows the user to move a target image to a position at which the target image is easily viewed before performing the pinch operation to improve convenience. For example, the user is also allowed to enlarge an image by the pinch-out after moving a portion of the image 311 required to be enlarged to the center and easily-viewable position of the left-side region 301. Note that the movability of a target image even after the pinch-out will be described with reference to FIG. 4 below.

In the above embodiment, it is possible to enlarge and reduce an image outside an active region by the pinch-in and the pinch-out. In addition, as shown in the example of FIGS. 3C and 3D, the system control unit 50 may move the active frame 303 to the left-side region 301 including the enlarged image 311 when the image 311 is enlarged. That is, the system control unit 50 may move an active frame (active region) to a region including an enlarged and reduced target image when the image in a region other than the active region is enlarged and reduced.

Processing Flow

Figure 4:
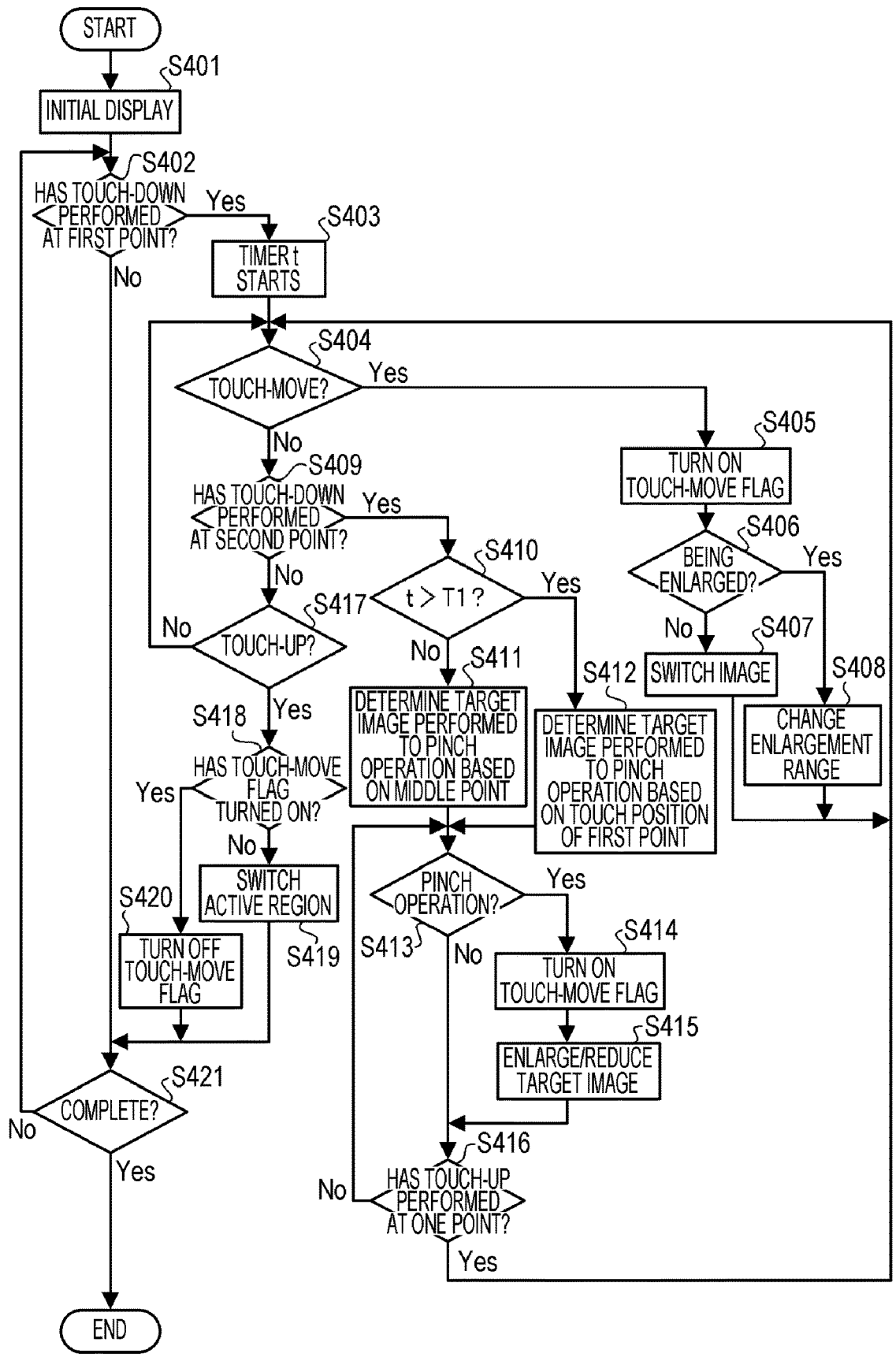
FIG. 4 is a flowchart showing an example of enlargement and reduction processing for a target image.

FIG. 4 is a flowchart showing an example of enlargement and reduction processing for a target image according to the present embodiment. The processing performed in the flowchart is realized when a program recorded in the non-volatile memory 56 is developed into the system memory 52 and performed by the system control unit 50. That is, the system memory 52 is used as a work memory. In addition, the processing of FIG. 4 is started when the reproduction mode is set by a user and then the dual-screen display mode is also set.

In step S401, the system control unit 50 performs an initial display in the dual-screen display mode on the display unit 28. In the dual-screen display mode, two images are displayed in parallel as shown in the example of FIG. 3A. It is assumed that an image initially displayed in the left-side region 301 is the newest image among images recorded in the storage medium 200, and that an image initially displayed in the right-side region 302 is the second-newest image among the images recorded in the storage medium 200. However, an image recorded before the second newest image may also be displayed. That is, the user is allowed to select an image to be displayed.

In step S402, the system control unit 50 determines whether the touch-down has been performed at a first point in a state in which even one point has not been touched. The system control unit 50 proceeds to step S403 when the touch-down has been performed at the first point. Otherwise, the system control unit 50 proceeds to step S421.

In step S403, the system control unit 50 initializes a timer t and starts counting (timing). The timer t (timing unit) is a timer for determining whether a time between the touch-down at the first point and the touch-down at a second point exceeds a threshold T1 (for example, 0.3 seconds). The system control unit 50 sets the timer t at the initial value 0 in step S403, and counts up the timer t in step S403 and the subsequent steps to measure an elapsed time. Further, when the processing transits to step S403 again, the timer t is reset at the initial value 0.

In step S404, the system control unit 50 determines whether the touch-move has been performed. At this time, the touch-on has been performed only at the first point. The system control unit 50 proceeds to step S405 when the touch-move has been performed. Otherwise, the system control unit 50 proceeds to step S409.

In step S405, the system control unit 50 turns on a touch-move flag held in the system memory 52. The touch-move flag represents a flag showing whether the touch-move has been performed in the period between the touch-down and the touch-up, and its initial value is off. As will be described in detail later, the touch-move flag is used for determining whether a tap operation has been performed. Since it is determined in step S404 that the touch-move has been performed, the touch-move flag is turned on in step S405.

In step S406, the system control unit 50 determines whether an image displayed in an active region has been enlarged and displayed. When the image is displayed at a size at which the whole image is fitted in the active region, the system control unit 50 determines that the image has not been enlarged and displayed (the image has been displayed at a normal size) and proceeds to step S407. On the other hand, when the image has been displayed at a size at which the whole image is not fitted but only a part of the image is fitted in the active region, the system control unit 50 determines that the image has been enlarged and displayed and proceeds to step S408.

In step S407, the system control unit 50 switches the image displayed in the active region to another image according to the touch-move detected in step S404. For example, when the touch-move (flick) has been performed rightward, the system control unit 50 switches the image to an image having a previous file number. When the touch-move (flick) has been performed leftward, the system control unit 50 switches to an image having the following file number.

In addition, the processing in step S407 may be changed according to the speed of the touch-move. For example, although switching the image as described above when the touch-move has been quickly performed at at least a predetermined speed, the system control unit 50 may move the image according to the touch-move when the touch-move has been slowly performed at a speed less than the predetermined speed. Thus, in a case in which a corner of the image is required to be enlarged or the like, the image is allowed to be moved in advance to a position at which the image is easily viewed before being enlarged and reduced.

In step S408, the system control unit 50 changes, according to the touch-move detected in step S404, a display range (enlargement range) in the enlargement display of the image displayed in the region of the position at which the touch-down has been detected in step S402. That is, the system control unit 50 scrolls the image displayed in the active region so that the display range is changed according to the movement of the touch position. Accordingly, although a partial region of the image has not been displayed in a page when the image has been enlarged and displayed, it becomes possible to display a region not displayed during the enlargement display in the page and confirm the same.

Note that when the touch-down is performed at the second point with the touch-on held at the first point and the pinch-operation is performed, Yes is determined in step S409 and step S413, whereby the image is allowed to be enlarged and reduced again.

On the other hand, in step S409, the system control unit 50 determines whether the touch-down has been performed at the second point. When it is determined that the touch-down has been performed at the second point, the system control unit 50 proceeds to step S410. Otherwise, the system control unit 50 proceeds to step S417. Note that when the touch-down has been performed at the second point, a multi-touch state is created in which the touch-on has been performed at the two places.

In step S410, the system control unit 50 determines whether the timer t started in step S403 has exceeded the threshold T1 (for example, 0.3 seconds). That is, the system control unit 50 determines whether the period (time difference) between the touch-down at the first point and the touch-down at the second point has exceeded the threshold T1. The system control unit 50 proceeds to step S412 when the period has exceeded the threshold T1. The system control unit 50 proceeds to step S411 when the period is not more than the threshold T1.

In step S411, the system control unit 50 determines an image displayed in the region of the middle point between the touch position of the first point and the touch position of the second point as a target image that is to be enlarged and reduced by the pinch operation. That is, when the time between the touch-down at the first point and the touch-down at the second is shorter than the threshold T1, the system control unit 50 regards the image 312 in the right-side region 302 including the middle point P3 as a target image in the example of FIG. 3B.

Note that the system control unit 50 may regard a display region on the side of a target image as an active region when an image outside the current active frame 303 (outside the active region) is determined as the target image, and then move the active frame 303 to the display region. The same applies to step S412 that will be described next.

In step S412, the system control unit 50 determines an image displayed in the region of the position of the first point at which the touch-down has been performed as a target image that is to be enlarged and reduced by the pinch operation regardless of the middle point between the touch position of the first point and the touch position of the second point. That is, when the time between the touch-down at the first point and the touch-down at the second point is greater than the threshold T1, in the examples of FIGS. 3C and 3D, the system control unit 50 regards the image 311 in the left-side region 301 corresponding to the position P11 of the first point at which the touch-down has been performed as a target image.

In step S413, the system control unit 50 determines whether the pinch operation has been performed. The system control unit 50 proceeds to step S414 when detecting the pinch-out or the pinch-in. Otherwise, the system control unit 50 proceeds to step S416.

In step S414, the system control unit 50 turns on a touch-move flag held in the system memory 52. In step S415, the system control unit 50 enlarges or reduces the target image to be performed the pinch operation determined in step S411 or step S412 about a reference position. That is, the system control unit 50 enlarges the target image about the reference position with an enlargement magnification corresponding to the separated distance between the touch positions of the two points when the pinch-out has been performed. Further, the system control unit 50 reduces the target image with a reduction magnification corresponding to the approximated distance between the touch positions of the two points when the pinch-in has been performed.

Further, the system control unit 50 basically regards the middle point between the touch positions of the two points as the reference position. However, when the middle point between the touch positions of the two points is outside a display region, the system control unit 50 regards a point inside a target image closest to the middle point as the reference position.

In step S416, the system control unit 50 determines whether the touch-up has been performed at one point (one place) among the two points (two places) at which a multi-touch has been performed. When the touch-up has been performed at the one point (i.e., when the state of the multi-touch is cancelled and thus the state of a single touch at one place has been created), the system control unit 50 proceeds to step S404. When the touch-up has not been performed at one point and the state of the multi-touch is held, the system control unit 50 proceeds to step S413.

In step S417, the system control unit 50 determines whether the touch-up has been performed in the state of the single touch at the one place. When the touch-up has been performed, i.e., when the state of the touch-off has been created in which the touch panel has not been touched at all, the system control unit 50 proceeds to step S418. Otherwise (when the touch panel remains touched), the system control unit 50 proceeds to step S404.

In step S418, the system control unit 50 determines whether the touch-move flag held in the system memory 52 has been turned on. When it is determined that the touch-move flag has been turned on, it is indicated that the touch operation at this time includes the touch-move and differs from a tap operation not accompanying the movement of a touch position. Therefore, the system control unit 50 proceeds to step S420 without performing processing corresponding to a tap. In step S420, the system control unit 50 turns off the touch-move flag.

When the touch-move flag has been turned off in step S418, the system control unit 50 proceeds to step S419. When the touch-move flag has been turned off, it is indicated that the touch operation at this time does not include the touch-move and a tap operation (touch operation not accompanying the touch move, i.e., a touch and release operation) has been performed.

In step S419, the system control unit 50 changes the active region as processing corresponding to the tap operation. That is, when the tap operation has been performed at a position inside the right-side region 302 in a state in which the active region is the left-side region 301 before the tap operation, the system control unit 50 changes the active region from the left-side region 301 to the right-side region 302. In addition, the system control unit 50 moves the active frame 303 from the left-side region 301 to the right-side region 302.

Further, when the tap operation has been performed at a position inside the left-side region 301 in a state in which the active region is the left-side region 301 before the tap operation, the system control unit 50 does not change the active region.

Furthermore, when the tap operation has been performed at a position inside the left-side region 301 in a state in which the active region is the right-side region 302 before the tap operation, the system control unit 50 changes the active region from the right-side region 302 to the left-side region 301. In addition, the system control unit 50 moves the active frame 303 from the right-side region 302 to the left-side region 301.

Furthermore, when the tap operation has been performed at a position inside the right-side region 302 in a state in which the active region is the right-side region 302 before the tap operation, the system control unit 50 does not change the active region.

In step S421, the system control unit 50 determines whether the completion event (such as turning off a power and switching to another operation mode) of a dual-screen display mode has occurred. When the completion event has not occurred, the system control unit 50 returns to step S402 to wait for a next touch-down. When the completion event has occurred, the system control unit 50 completes the processing of FIG. 4.

Effects

As described above, in the pinch operation in which the touch-down has been almost simultaneously performed at two points to perform a multi-touch, an image at the middle point between two touch positions is enlarged or reduced as a target image like step S411. This is because it is assumed that the user has originally started the pinch operation with attention paid to the middle point between the two points. On the other hand, in the pinch operation in which the touch-down has been performed at two points at a time interval to perform a multi-touch, an image at the touch position of a first point is enlarged or reduced as a target like step S412. This is because it is assumed that the user has started the pinch operation with attention paid to the touch position of the first point. In this manner, in the present embodiment, a target to be enlarged or reduced in the pinch operation in any of a plurality of regions is adaptively made different according to the operation of the user. Thus, it becomes possible to enlarge or reduce a target further meeting the intention of the user with a simple operation.

In addition, when a plurality of images is displayed in the dual-screen display mode, only an image in an active region is regarded as a target image and highly-important processing such as deleting an image, assigning an attribute such as a favorite, and editing is performed on the target image to prevent an image in a region other than the active region from being falsely operated. On the other hand, in the present embodiment, when a relatively low-important operation such as enlarging or reducing an image is performed, an image in a region other than an active region is also allowed to be processed as a target image. Therefore, the processing may be performed in one step, which improves operability.

Note that the type of an operation allowed to be processed (i.e., the operation with which an image is allowed to be regarded as a target image) in a region other than an active region may be set by the user. For example, by user settings, only an image in the active region may be processed for image deletion and editing, and an image in a region other than the active region may be processed for image enlargement and reduction and assignment of an attribute such as a favorite.

Other Embodiments

The present embodiment describes an example in which the middle point between the touch positions of two points is regarded as a reference position and an image is enlarged and reduced about the reference position. However, the present embodiment is not limited to the example. The reference position may be set within the range between the touch positions of the two points. For example, when the time between the touch-down at a first point and the touch-down at a second point exceeds the threshold T1, a point at a position between the touch position of the first point and the touch position of the second point and slightly closer to the touch position of the first point than the second point may be regarded as the reference position. Under the same situation, the touch position of the first point may be regarded as the reference position.

The present embodiment describes an example in which the multi-touch at two points is performed. However, the present embodiment is not limited to the example. A target image may be enlarged or reduced according to a multi-touch at at least three points. For example, when the touch-down is performed at three points, the system control unit 50 regards the middle point between the three points as a reference position and regards an image positioned at the middle point as a target image. In addition, the system control unit 50 may enlarge or reduce the target image according to the total value (or the average value) of the distances between the respective points and the reference position.

The present embodiment describes an example in which a target image is enlarged or reduced according to a change in the relative distance between the touch positions of two points. The target image may be enlarged or reduced in proportion to the relative distance between the touch positions of the two points, or an enlargement magnification or a reduction magnification corresponding to the distance between the touch positions of the two points may be changed according to the movement speeds of the touch positions of the two points. For example, when the movement speeds of the touch positions of the two points for performing the pinch-out are relatively fast, the enlargement magnification corresponding to the distance between the touch positions of the two points is increased. On the other hand, when the movement speeds of the touch positions of the two points are relatively slow, the enlargement magnification corresponding to the distance between the touch positions of the two points is decreased. Thus, it becomes possible to quickly enlarge an image and easily perform the fine adjustment of an image size.

The present embodiment describes an example in which a point inside a target image closest to a middle point is regarded as a reference position when the middle point between the touch positions of two points is outside the display region of the target image. However, the present embodiment is not limited to the example. When the middle point between the touch positions of the two points is outside the display region, the acceptance of the pinch-operation may be rejected. In addition, a pop-up display or the like may inform the user of a state in which the middle point between the touch positions of the two points is outside the display region to urge the pinch-operation again.

The system control unit 50 may use the internal clock of the digital camera 100 as the timer t (timing unit) for counting the period between the start of touching a first point and the start of touching a second point in a multi-touch.

The present embodiment describes an example in which enlargement and reduction are performed when images are displayed in two respective regions. However, the display mode of the regions is not limited to the above example, and the regions may include at least three regions. For example, the processing of the present embodiment is applicable when images are displayed in four respective regions divided into four sections in vertical and horizontal directions or when a plurality of windows (display regions in which target images are to be enlarged and reduced) is displayed in a multi-window system. In addition, target images to be enlarged and reduced are not limited to the images shown in the present embodiment, and display objects capable of being enlarged and reduced by the pinch operation such as documents, maps, web pages, graphic, and tables are applicable.

The present embodiment describes an example in which an image inside a region in which the middle point between the touch position of a first point and the touch position of a second is present is regarded as a target image when the time between the touch-down at the first point and the touch-down at the second point is not more than the threshold T1. However, the present embodiment is not limited to the example and may use the following method.

When a time difference between the touch-downs is not more than the threshold T1 and the same image corresponds to the touch positions of the first point and the second point, the system control unit 50 regards the middle point between the touch position of the first point and the second point as a reference position and enlarges and reduces a target image like the present embodiment. On the other hand, when images corresponding to the touch positions of the first point and the second point are different from each other, the system control unit 50 may regard the middle point between the touch positions of the first point and the second point as a reference position and enlarge the whole screen without specifying a target image.

For example, let it be assumed that an image A is present at the touch position of a first point, an image B is present at the touch position of a second point, the image B is positioned at the middle point between the touch positions of the first point and the second point, and the image A is positioned in the vicinity of the middle point. In this case, the middle point on the image B becomes a reference position, and not only the image B but also the image A are enlarged (or reduced) about the reference position.

Moreover, the present embodiment describes an example in which enlargement and reduction are performed by a pinch operation in a multi-touch state. However, the present embodiment is also applicable to the rotation of a target image with the rotational movement operation (twist operation) in the multi-touch state. The rotational movement operation (twist operation) in the multi-touch state represents an operation in which the touch positions of a first point and a second point in the multi-touch state are moved in a clockwise direction or a counterclockwise direction about a middle point. The system control unit 50 changes the display direction of a target image according to the rotational movement operation. The target image may be rotated at a rotation angle corresponding to the movement amounts of the touch position of the first point and the touch position of the second point, or may be rotated by 90° every time the rotational movement operation is performed.

On this occasion, the target image of which the display direction is rotated may be determined like the processing of the present embodiment. For example, when the touch-down is almost simultaneously performed at the position P11 and the position P21 in FIG. 3B and then the rotational movement operation is performed, the system control unit 50 rotates the image 312 at the position P3 corresponding to the middle point as a target image. In this case, the rotational movement operation is an operation in which the touch position of the first point is moved upward from the position P11 and the touch position of the second point is moved downward from the position P21, or an operation in which the touch position of the first point is moved downward from the position P11 and the touch position of the second point is moved upward from the position P21. The image 312 is rotated clockwise when the former operation is performed, and the image 312 is rotated counterclockwise when the latter operation is performed.

On the other hand, when the touch-down is performed at the position P21 with a time difference exceeding a predetermined time (for example, 0.3 seconds) after the touch-down at the position P11 in FIG. 3D and then the rotational movement operation is performed, the image 311 at the position corresponding to the touch-down at the first point is rotated.

In order to realize the processing, the following processing is only required to be added to the flowchart of FIG. 4. In step S411, the image displayed in the region of the middle point between the touch positions of the first point and the second point is determined as a target image to be enlarged and reduced by the pinch operation. However, the same image is also determined as a target image for the rotational movement operation. Similarly, in step S412, the image displayed in the region of the position corresponding to the touch-down at the first point is determined as a target image to be enlarged and reduced by the pinch operation. However, the image is also determined as a target image for the rotational movement operation. That is, the selection of a target image is substantially the same as the operation of performing enlargement and reduction.

Further, the step of determining the rotational movement operation is newly added after No in step S413 and before step S416 in the flowchart of FIG. 4. In the step, a target image is rotated according to the rotational movement operation when the rotational movement operation is performed.

The present embodiment describes an example in which even an image in a region other than an active region is allowed to be processed as a target image when an operation such as enlargement, reduction, and rotation of an image is performed. However, an operation in which an image is allowed to be processed as a target image and an operation in which the image is not allowed to be processed as the target image may be set for each multi-touch operation. For example, an image in a region other than an active region may be allowed to be processed for the enlargement and reduction of an image by a multi-touch operation, and only an image inside the active region may be allowed to be processed for the rotation of the image by the multi-touch operation.

The present embodiment describes an example in which a method for selecting a target image to be enlarged and reduced is different depending on whether a time difference between two fingers that has performed the touch-on to perform the pinch-out and the pinch-in is not more than 0.3 seconds (predetermined time). However, the predetermined time is changeable to any time. In addition, the user may set the predetermined time at desired time.

Note that the above various control performed by the system control unit 50 may be performed by one hardware, or a plurality of hardware (for example, a plurality of processors or circuits) may share processing to control the whole apparatus.

In addition, the present invention is described in detail above based on the preferred embodiments. The present embodiment is not limited to the specific embodiments but includes various modes without departing from its scope. Moreover, the above embodiments show only an example of the present invention.

Further, the above embodiments describe an example in which the present invention is applied to the digital camera 100. However, the embodiments are not limited to the example, and electronic device is applicable so long as it is capable of detecting a multi-touch. That is, the present invention is applicable to a personal computer, a PDA (such as a tablet terminal), a mobile phone terminal (such as a smart phone), or a mobile image viewer. In addition, the present invention is applicable to a printer apparatus, a digital photo frame, a music player, a video game machine, an electronic book reader, or the like provided with a display.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s)

and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-241943, filed on Dec. 18, 2017, which is hereby incorporated by reference herein in its entirety.

What is claimed is:

1. An electronic device comprising:
   a touch detector configured to detect a touch operation on a display unit; and
   at least one processor or circuit to perform the operations of the following units:
   a display control unit configured to control to display a plurality of display objects on the display unit; and
   a control unit configured to
   control to, in a first case where a multi-touch in which a time difference between a start of touching a first point and a start of touching a second point is within a predetermined time is performed,
      regard, as a processing target, a display object at a first position between a touch position of the first point and a touch position of the second point among the plurality of display objects and
      perform specific processing to the display object regarded as the processing target according to a subsequent relative change between the touch position of the first point and the touch position of the second point, and
   control to, in a second case where a multi-touch in which a time difference between the start of touching the first point and the start of touching the second point exceeds the predetermined time is performed,
      regard a display object at the touch position of the first point as a processing target and
      perform the specific processing to the display object regarded as the processing target according to a subsequent relative change between the touch position of the first point and the touch position of the second point without performing the specific processing to a display object, among the plurality of display objects, other than the display object at the touch position of the first point,
   wherein in both the first case and the second case, the control unit controls to perform the specific processing according to the relative change of the touch position of the second point with respect to the touch position of the first point.

2. The electronic device according to claim 1, wherein the first position is a middle point between the touch position of the first point and the touch position of the second point.

3. The electronic device according to claim 1, wherein in a case where a multi-touch in which a time difference between a start of touching a first point and a start of touching a second point is within the predetermined time is performed, a first display object among the plurality of display objects is displayed at the touch position of the first point, and a second display object among the plurality of display objects is displayed at the first position, the control unit controls to perform the specific processing to the second display object without performing the specific processing to the first display object according to a subsequent relative change between the touch position of the first point and the touch position of the second point.

4. The electronic device according to claim 1, wherein in a case where a multi-touch in which a time difference between a start of touching a first point and a start of touching a second point exceeds the predetermined time is performed, a first display object among the plurality of display objects is displayed at the touch position of the first point, and a second display object among the plurality of display objects is displayed at the first position, the control unit controls to perform the specific processing to the first display object without performing the specific processing to the second display object according to a subsequent relative change between the touch position of the first point and the touch position of the second point.

5. The electronic device according to claim 1, wherein the specific processing is enlargement or reduction of a display object according to a change in a relative distance between the touch position of the first point and the touch position of the second point in the multi-touch.

6. The electronic device according to claim 1, wherein the specific processing is changing of a display direction of a display object according to relative rotational movements of the touch position of the first point and the touch position of the second point in the multi-touch.

7. The electronic device according to claim 1, further comprising:
   a timer configured to count a period between the start of touching the first point and the start of touching the second point in the multi-touch.

8. The electronic device according to claim 1, wherein the display control unit controls to perform, for any of the plurality of display objects, an identification display indicating that the display object is selected, and controls to perform the identification display for the display object regarded as the processing target by the control of the control unit, in a case where a multi-touch is performed.

9. The electronic device according to claim 1, wherein the control unit controls to enlarge or reduce the display object regarded as the processing target with, as a center position, a middle point between the touch position of the first point and the touch position of the second point in a case where the middle point is inside the display object regarded as the processing target, and controls to enlarge or reduce the display object regarded as the processing target with, as the center position, a point, inside the display object, closest to the middle point, in a case where the middle point is outside the display object regarded as the processing target.

10. The electronic device according to claim 1, wherein, in a case where touching of one of a first point and a second point is ended and a touch position of the other of the first point and the second point is changed while only the other point remains touched, the control unit controls to move a display object regarded as a processing target according to a change in the touch position of the other point.

11. The electronic device according to claim 1, wherein the display object is an image captured by an image sensor.

12. The electronic device according to claim 11, further comprising
the image sensor.

13. A method for controlling an electronic device, comprising:
a step of detecting a touch operation on a display unit;
a step of controlling to display a plurality of display objects on the display unit; and
a step of
controlling to, in a first case where a multi-touch in which a time difference between a start of touching a first point and a start of touching a second point is within a predetermined time is performed,
regard, as a processing target, a display object at a first position between a touch position of the first point and a touch position of the second point among the plurality of display objects and
perform specific processing to the display object regarded as the processing target according to a subsequent relative change between the touch position of the first point and the touch position of the second point, and
controlling to, in a second case where a multi-touch in which a time difference between the start of touching the first point and the start of touching the second point exceeds the predetermined time is performed,
regard a display object at the touch position of the first point as a processing target and
perform the specific processing to the display object regarded as the processing target according to a subsequent relative change between the touch position of the first point and the touch position of the second point without performing the specific processing to a display object, among the plurality of display objects, other than the display object at the touch position of the first point,
wherein in both the first case and the second case, it is controlled to perform the specific processing according to the relative change of the touch position of the second point with respect to the touch position of the first point.

14. A non-transitory computer readable medium that stores a program, wherein the program causes a computer to execute:
a step of detecting a touch operation on a display unit;
a step of controlling to display a plurality of display objects on the display unit; and
a step of
controlling to, in a first case where a multi-touch in which a time difference between a start of touching a first point and a start of touching a second point is within a predetermined time is performed,
regard, as a processing target, a display object at a first position between a touch position of the first point and the touch position of a second point among the plurality of display objects and
perform specific processing to the display object regarded as the processing target according to a subsequent relative change between the touch position of the first point and the touch position of the second point, and
controlling to, in a second case where a multi-touch in which a time difference between the start of touching the first point and the start of touching the second point exceeds the predetermined time is performed,
regard a display object at the touch position of the first point as a processing target and
perform the specific processing to the display object regarded as the processing target according to a subsequent relative change between the touch position of the first point and the touch position of the second point without performing the specific processing to a display object, among the plurality of display objects, other than the display object at the touch position of the first point,
wherein in both the first case and the second case, it is controlled to perform the specific processing according to the relative change of the touch position of the second point with respect to the touch position of the first point.

15. An electronic device comprising:
a touch detector configured to detect a touch operation on a display unit; and
at least one processor or circuit to perform the operations of the following units:
a display control unit configured to control to display, on the display unit, a screen in which a plurality of display objects including a first display object and a second display object is arranged; and
a control unit configured to, in a case where a multi-touch in which a second point is touched after a touch of a first point is performed, control to perform specific processing to a display object at a position, at which the touch of the first point is started, according to a subsequent relative change between a touch position of the first point and a touch position of a second point, regardless of selected states of the plurality of display objects before the multi-touch is performed,
the control unit
controlling to perform the specific processing to the first display object, without performing the specific processing to a display object other than the first display object, according to the relative change in a case where the touch of the first point is started inside a region in which the first display object is displayed, and
controlling to perform the specific processing to the second display object, without performing the specific processing to a display object other than the second display object, according to the relative change in a case where the touch of the first point is started inside a region in which the second display object is displayed.

16. The electronic device according to claim 15, wherein the control unit determines a display object to be performed the specific processing among the plurality of display objects, without referencing a position at which the touch of the second point is started.

17. The electronic device according to claim 15, wherein the specific processing is enlargement or reduction of a display object according to a change in a relative distance between the touch position of the first point and the touch position of the second point in the multi-touch.

18. The electronic device according to claim 15, wherein the specific processing is changing of a display direction of a display object according to relative rotational movements of the touch position of the first point and the touch position of the second point in the multi-touch.

19. A method for controlling an electronic device, comprising:
    a step of detecting a touch operation on a display unit;
    a step of controlling to display, on the display unit, a screen in which a plurality of display objects including a first display object and a second display object is arranged; and
    a step of, in a case where a multi-touch in which a second point is touched after a touch of a first point is performed, controlling to perform specific processing to a display object at a position, at which the touch of the first point is started, according to a subsequent relative change between a touch position of the first point and a touch position of a second point, regardless of selected states of the plurality of display objects before the multi-touch is performed, wherein
    in the step of controlling to the perform specific processing,
    control is executed to perform the specific processing to the first display object, without performing the specific processing to a display object other than the first display object, according to the relative change in a case where the touch of the first point is started inside a region in which the first display object is displayed, and
    control is executed to perform the specific processing to the second display object, without performing the specific processing to a display object other than the second display object, according to the relative change in a case where the touch of the first point is started inside a region in which the second display object is displayed.

20. A non-transitory computer readable medium that stores a program, wherein
    the program causes a computer to execute:
    a step of detecting a touch operation on a display unit;
    a step of controlling to display, on the display unit, a screen in which a plurality of display objects including a first display object and a second display object is arranged; and
    a step of, in a case where a multi-touch in which a second point is touched after a touch of a first point is performed, controlling to perform specific processing to a display object at a position, at which the touch of the first point is started, according to a subsequent relative change between a touch position of the first point and a touch position of a second point, regardless of selected states of the plurality of display objects before the multi-touch is performed, and
    in the step of controlling to the perform specific processing,
    control is executed to perform the specific processing to the first display object, without performing the specific processing to a display object other than the first display object, according to the relative change in a case where the touch of the first point is started inside a region in which the first display object is displayed, and
    control is executed to perform the specific processing to the second display object, without performing the specific processing to a display object other than the second display object, according to the relative change in a case where the touch of the first point is started inside a region in which the second display object is displayed.

* * * * *